United States Patent
Kim

(10) Patent No.: US 11,290,618 B2
(45) Date of Patent: Mar. 29, 2022

(54) METHOD FOR PROTECTING PERSONAL INFORMATION IN IMAGE FORMING APPARATUS

(71) Applicant: Hewlett-Packard Development Company, L.P., Spring, TX (US)

(72) Inventor: Jung Hun Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/050,612

(22) PCT Filed: Dec. 17, 2018

(86) PCT No.: PCT/KR2018/015970
§ 371 (c)(1),
(2) Date: Oct. 26, 2020

(87) PCT Pub. No.: WO2020/036265
PCT Pub. Date: Feb. 20, 2020

(65) Prior Publication Data
US 2021/0127035 A1    Apr. 29, 2021

(30) Foreign Application Priority Data
Aug. 16, 2018 (KR) .......................... 10-2018-0095564

(51) Int. Cl.
*H04N 1/44* (2006.01)
*G06F 3/12* (2006.01)
(Continued)

(52) U.S. Cl.
CPC ............ *H04N 1/444* (2013.01); *G06F 3/1203* (2013.01); *G06F 3/1222* (2013.01); *G06F 3/1224* (2013.01); *G06F 3/1285* (2013.01); *G06F 21/608* (2013.01); *G06F 21/6245* (2013.01); *H04N 1/0084* (2013.01); *H04N 1/00408* (2013.01); *H04N 1/00477* (2013.01);
(Continued)

(58) Field of Classification Search
None
See application file for complete search history.

(56) References Cited

U.S. PATENT DOCUMENTS 9,056,248 B2    6/2015    Alewine et al.
9,463,387 B2    10/2016    Alewine et al.
(Continued)

FOREIGN PATENT DOCUMENTS

| | | |
|---|---|---|
| JP | 2014-211771 A | 11/2014 |
| JP | 2017-163557 A | 9/2017 |
| WO | WO 2013/100943 A1 | 7/2013 |

*Primary Examiner* — Miya J Williams
(74) *Attorney, Agent, or Firm* — Jefferson IP Law, LLP

(57) ABSTRACT

An image forming apparatus and a method of operating an electronic apparatus are provided. The method includes activating a personal information protection policy corresponding to a country of use set in the image forming apparatus, receiving an execution request of a first application installed in the image forming apparatus, determining whether a first job to be performed by execution of the first application is restricted to the personal information protection policy, and controlling an operation of the image forming apparatus according to whether the first job is restricted to the personal information protection policy.

14 Claims, 10 Drawing Sheets

(51) Int. Cl.
*H04N 1/00* (2006.01)
*G06F 21/60* (2013.01)
*G06F 21/62* (2013.01)

(52) U.S. Cl.
CPC ....... *H04N 1/00875* (2013.01); *H04N 1/4406* (2013.01); *H04N 1/4426* (2013.01); *H04N 1/4446* (2013.01); *H04N 2201/0094* (2013.01)

(56) References Cited

U.S. PATENT DOCUMENTS

| | | |
|---|---|---|
| 9,911,282 B2 | 3/2018 | Alewine et al. |
| 2002/0054317 A1 | 5/2002 | Matsunoshita et al. |
| 2007/0279672 A1* | 12/2007 | Harada .................... H04N 1/44 |
| | | 358/1.14 |
| 2009/0276826 A1 | 11/2009 | Ando |
| 2014/0090028 A1 | 3/2014 | Matsugashita |
| 2014/0268210 A1* | 9/2014 | Park .................... H04N 1/32096 |
| | | 358/1.14 |
| 2015/0271666 A1* | 9/2015 | Arunachalam ......... H04L 63/20 |
| | | 455/410 |
| 2017/0070638 A1* | 3/2017 | Min ...................... G06F 21/608 |
| 2019/0026487 A1* | 1/2019 | Ichida .................. G06F 21/6254 |
| 2021/0377423 A1* | 12/2021 | Park .................. H04N 1/00482 |

* cited by examiner

[Fig. 1]
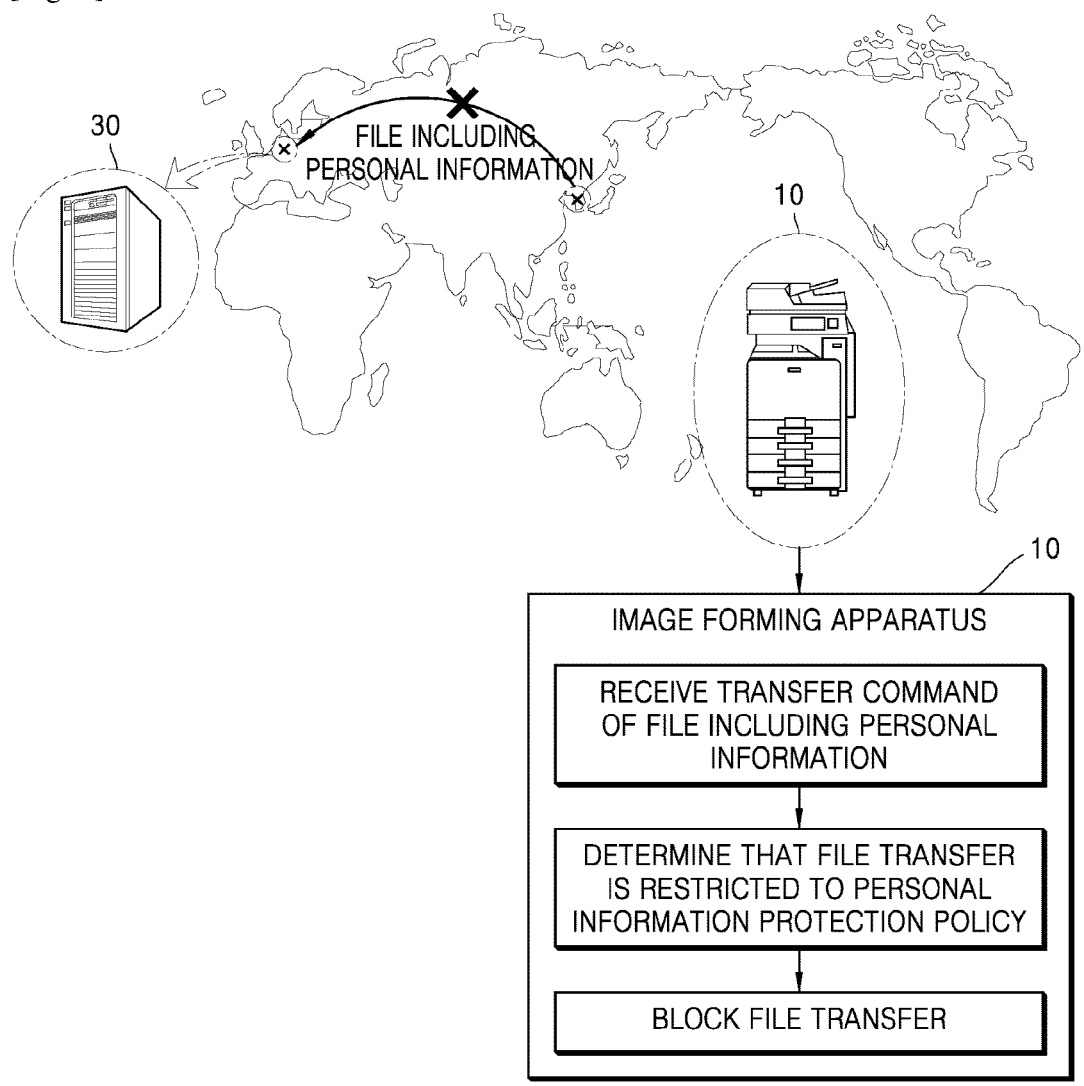

[Fig. 2]
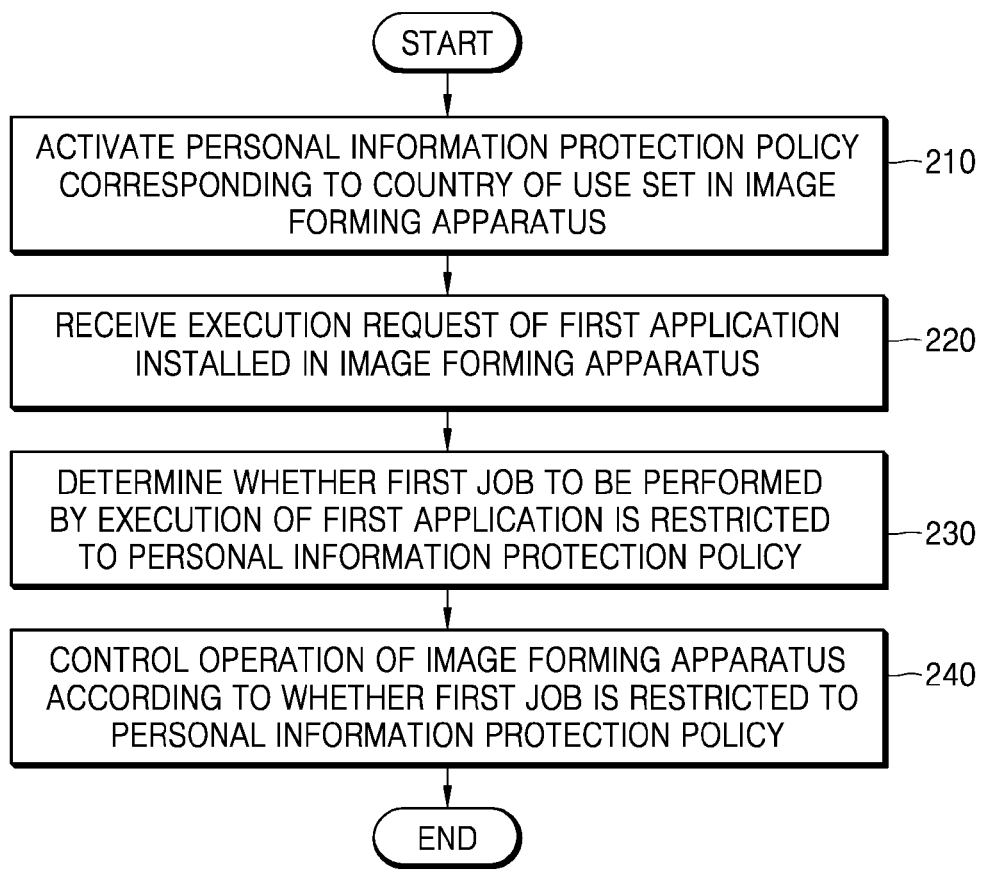

[Fig. 3]
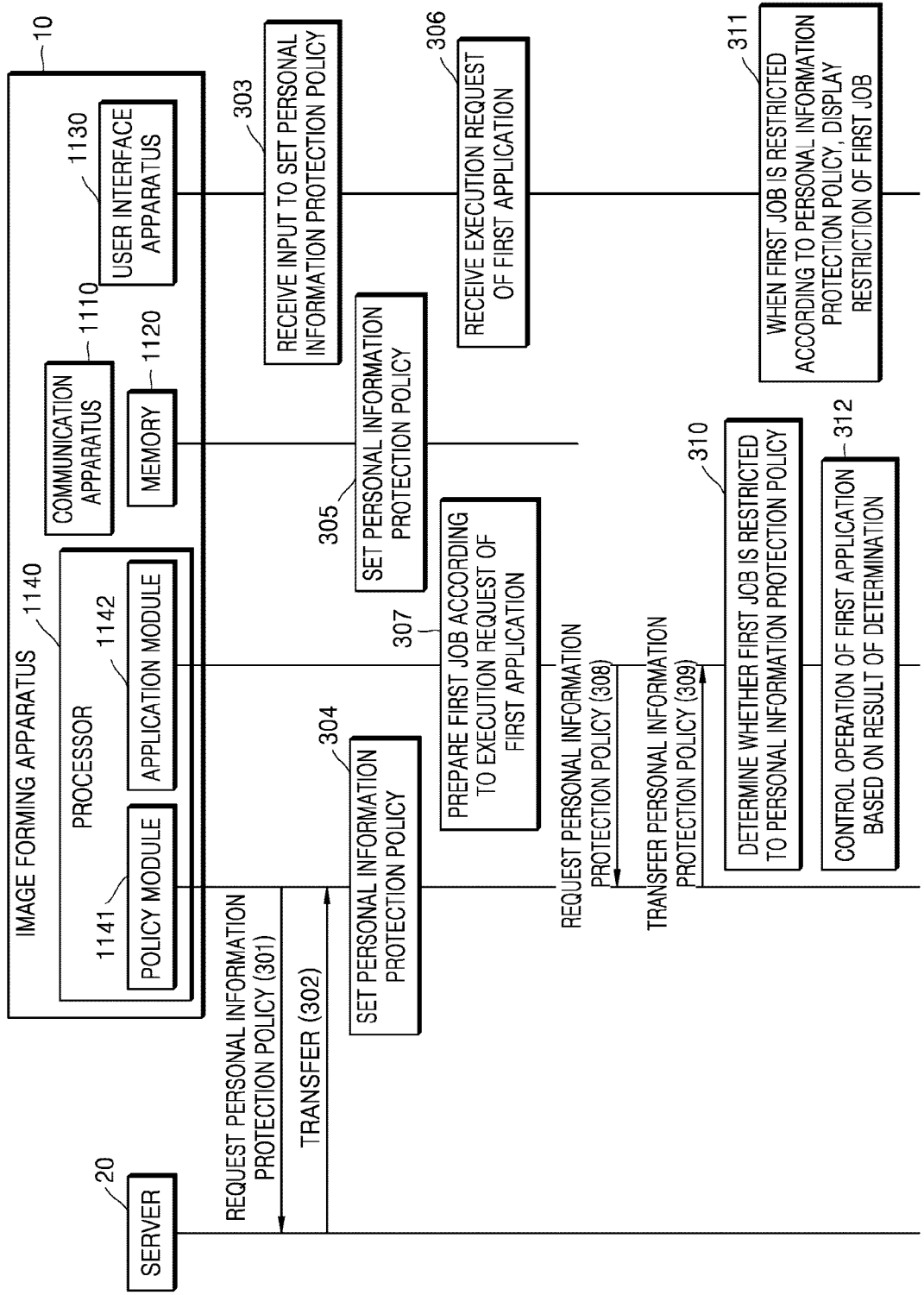

[Fig. 4]
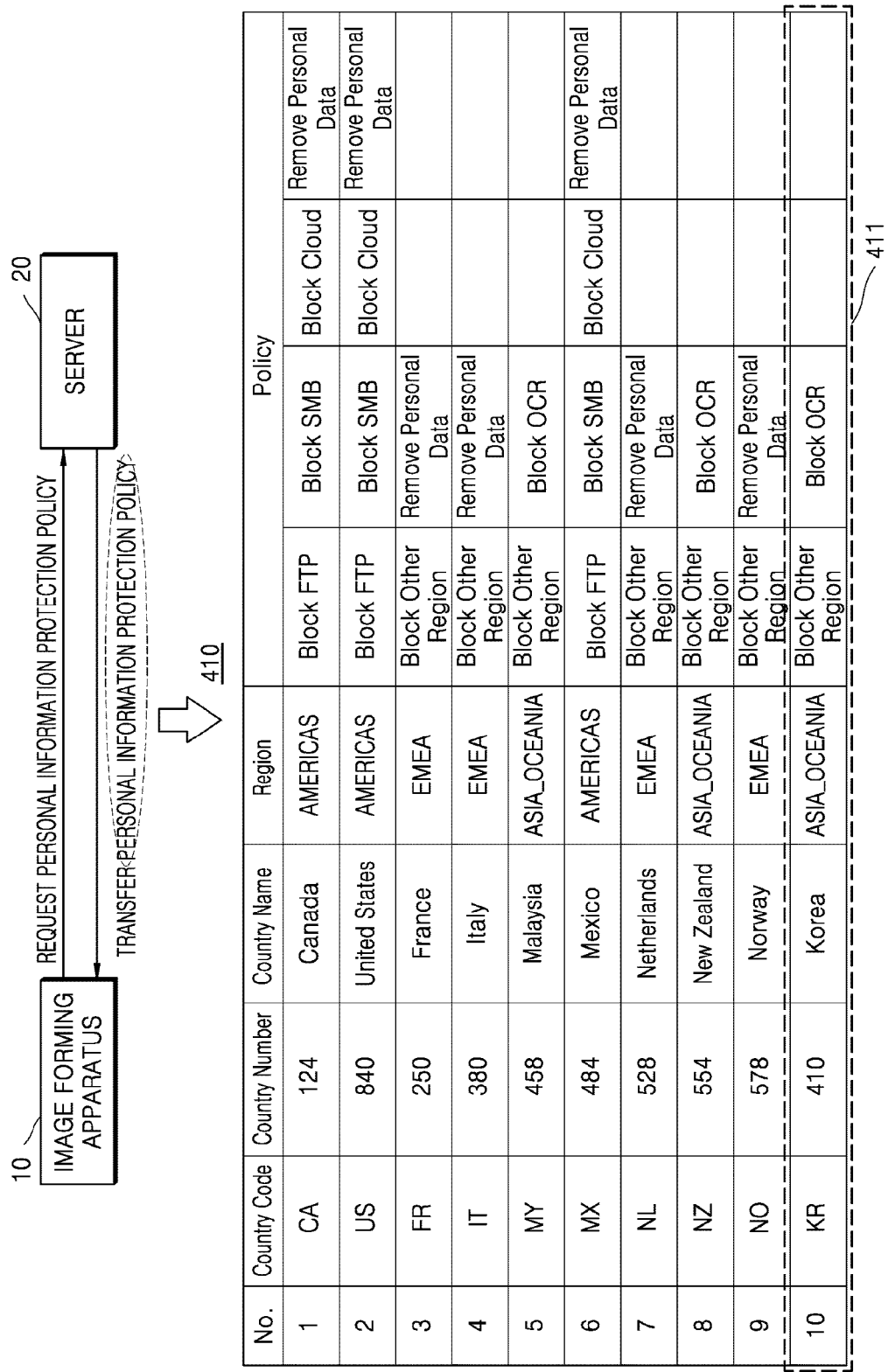

[Fig. 5]
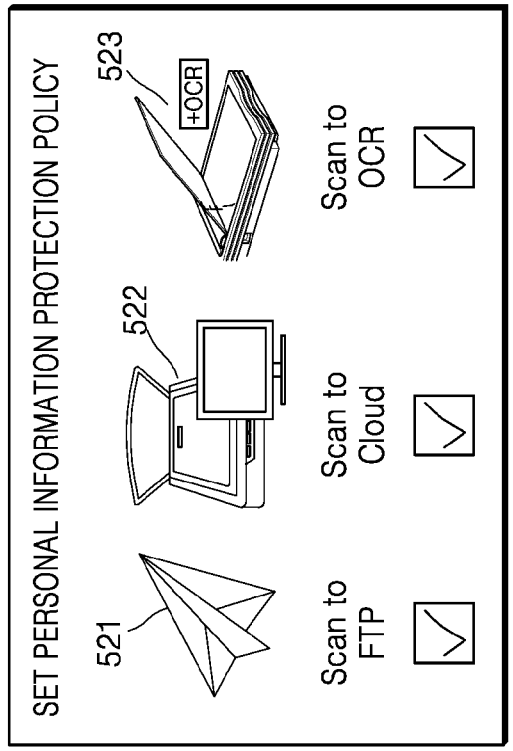
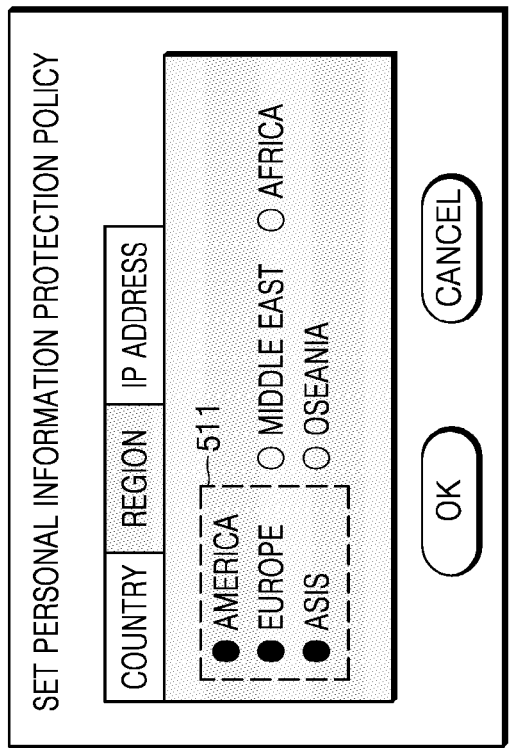

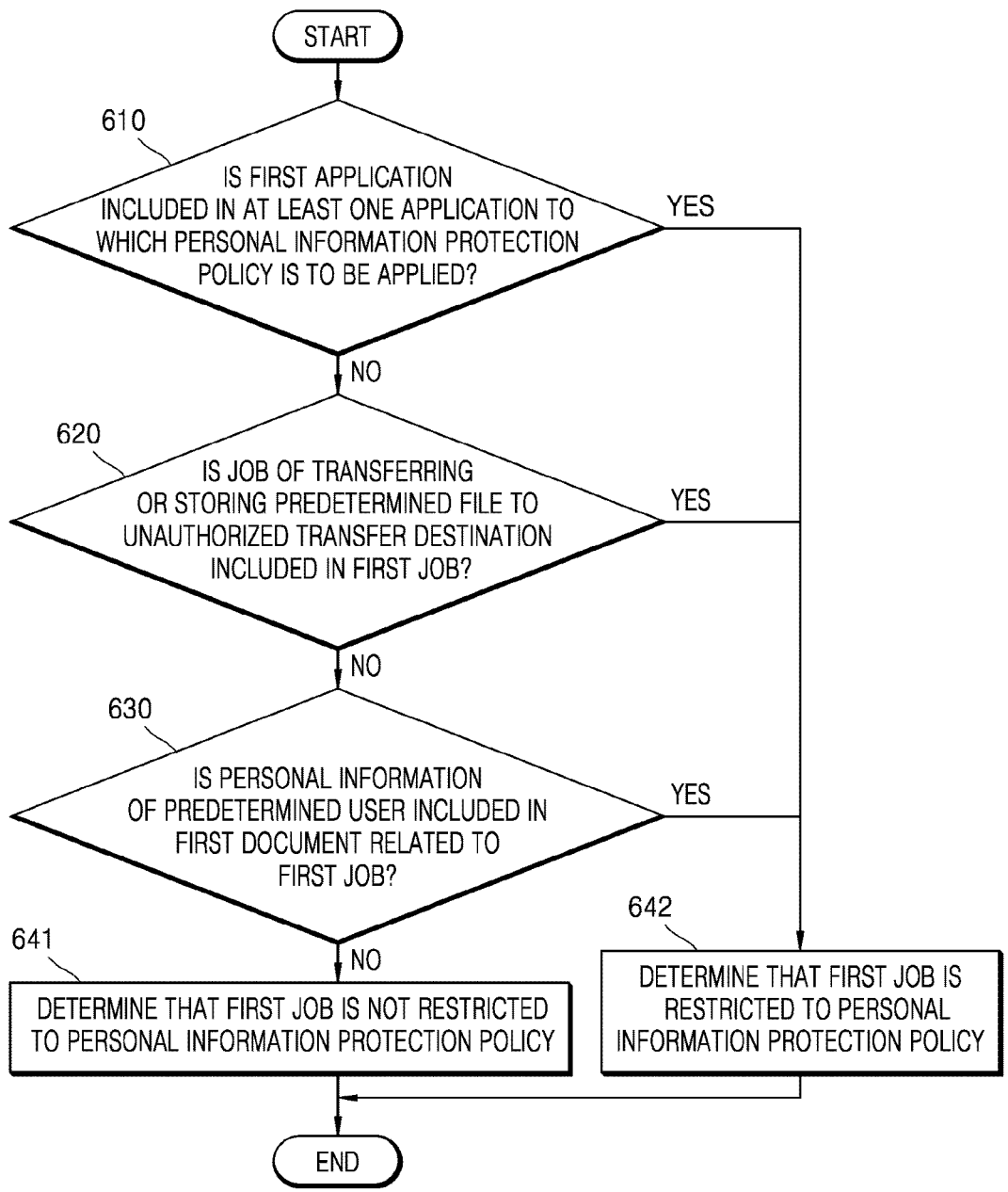
[Fig. 6]

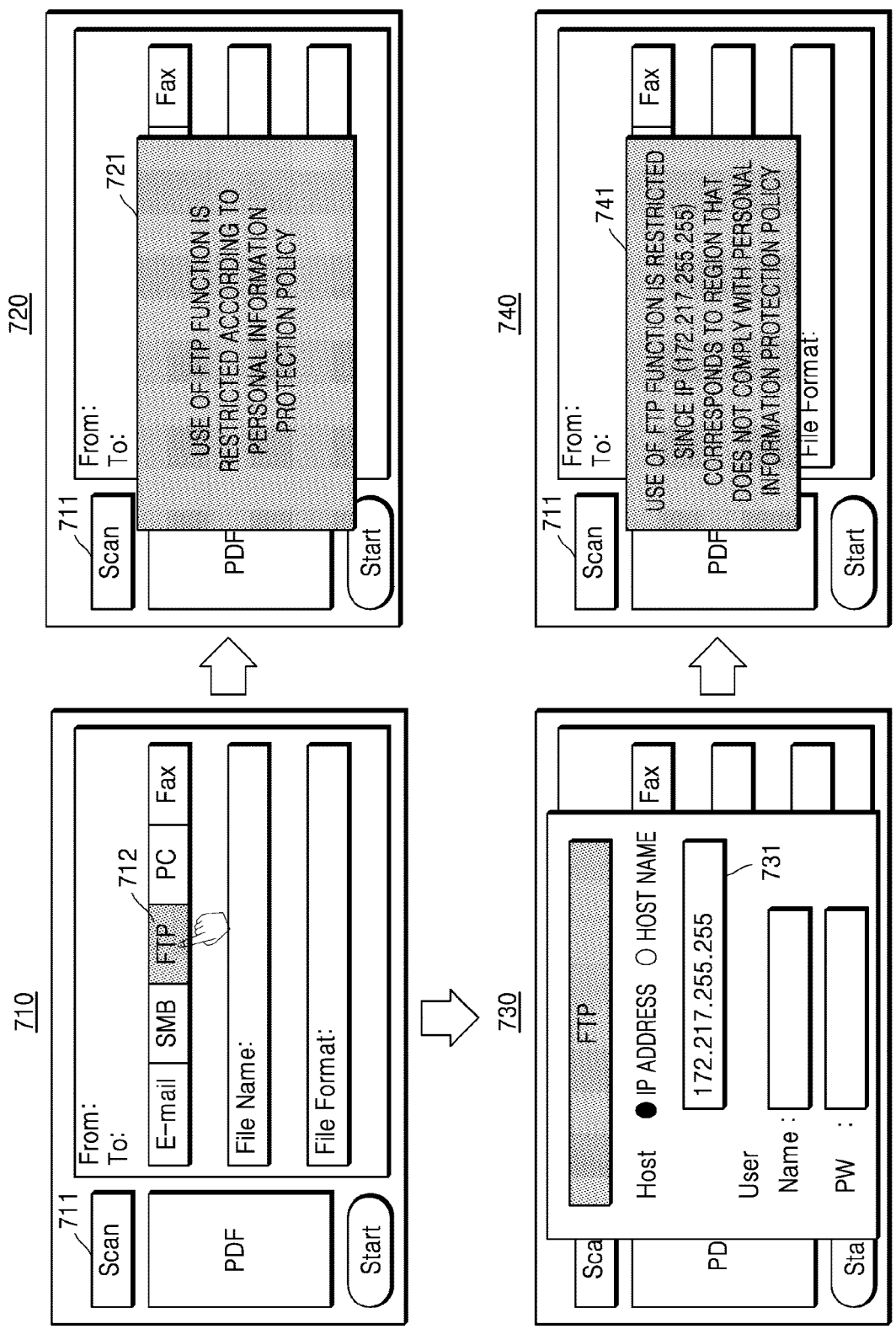

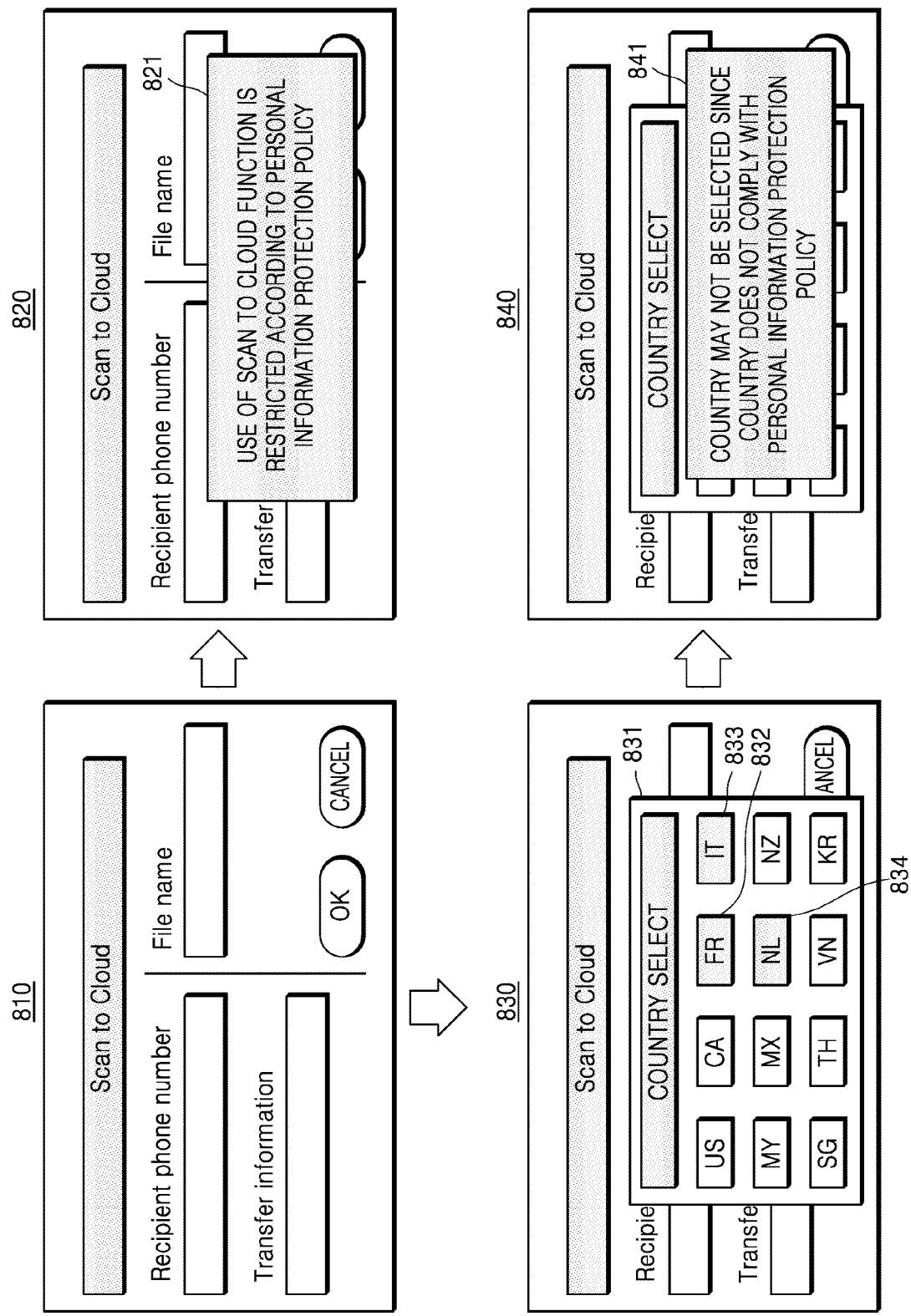

[Fig. 9]
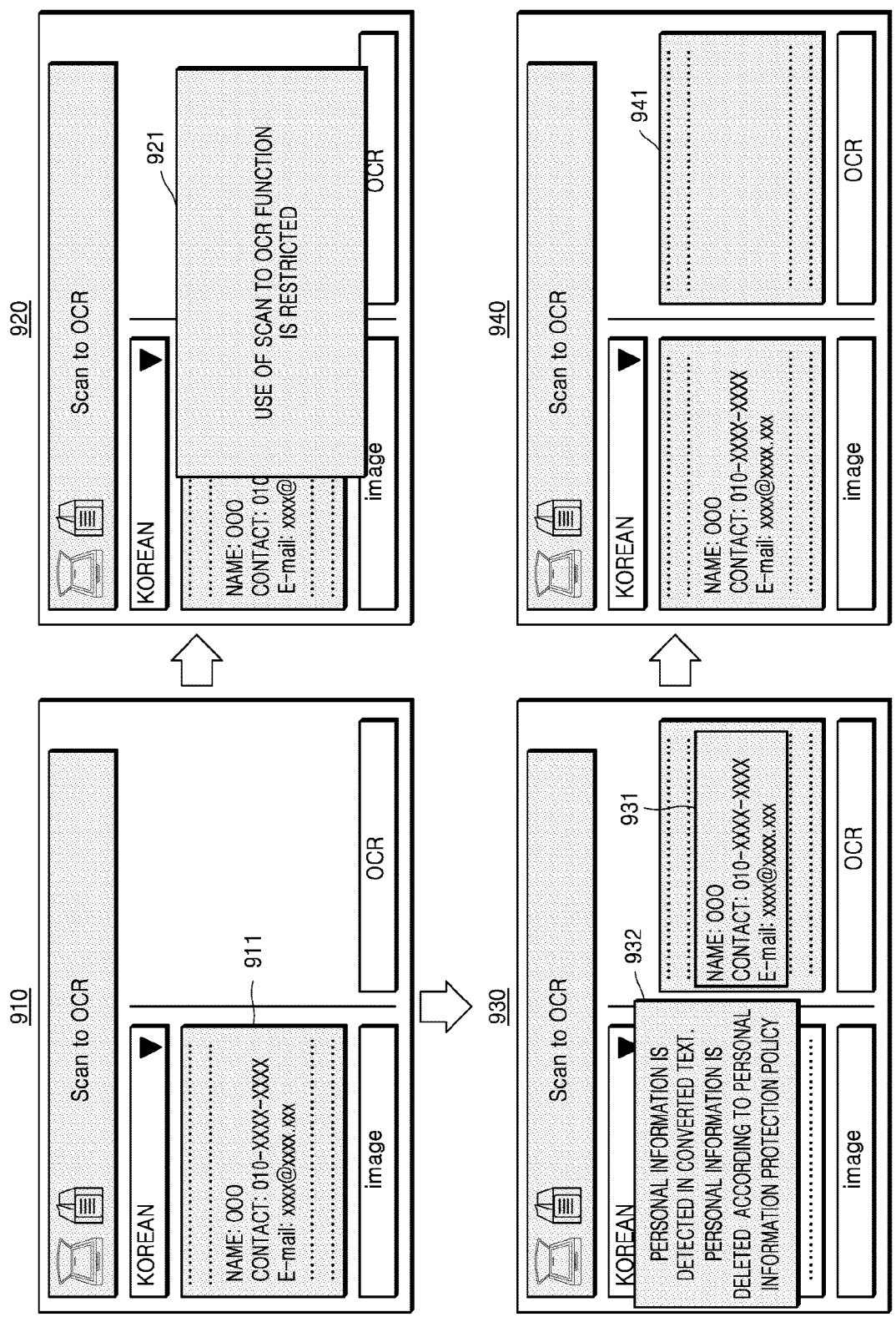

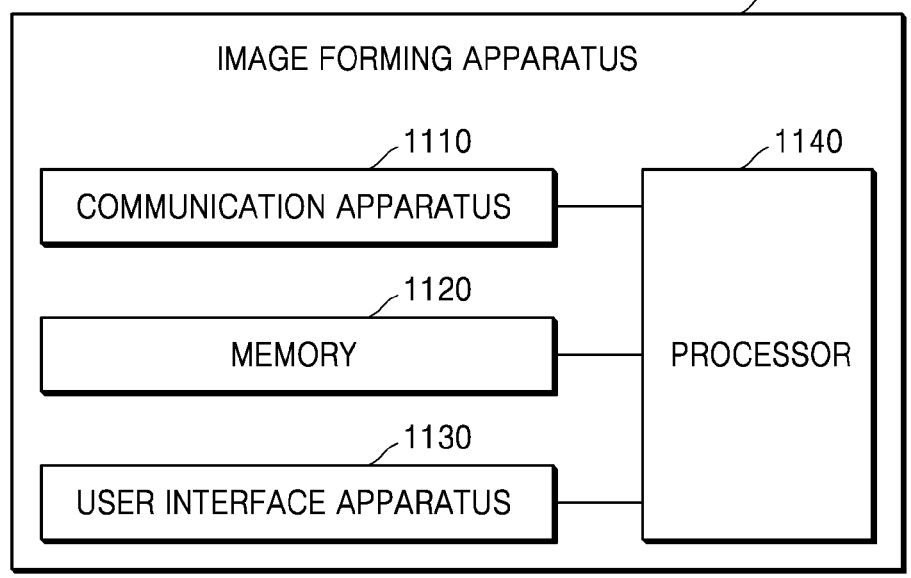

METHOD FOR PROTECTING PERSONAL INFORMATION IN IMAGE FORMING APPARATUS

BACKGROUND ART

Measures for protection standards and security related to collection, use, provision, and destruction of personal information in Korea and abroad have been strengthened. Even in Korea, the obligation of personal information protection, which has been applied to some companies such as public institutions, information communication providers, credit information providers, or the like, is expanding not only to public institutions, but also to service businesses, single-person businesses, and medical institutions.

Therefore, a technology for protecting personal information is applied to apparatuses and systems in which the management of personal information may be improved.

BRIEF DESCRIPTION OF DRAWINGS

The above and other aspects, features, and advantages of certain examples of the disclosure will be more apparent from the following description taken in conjunction with the accompanying drawings, in which:

FIG. 1 is a diagram for explaining a method of controlling an operation of an image forming apparatus to prevent personal information from leaking to a non-allowed transfer destination due to a job to be performed by the image forming apparatus, according to an example;

FIG. 2 is a flowchart illustrating a method of operating an image forming apparatus, according to an example;

FIG. 3 is a flowchart illustrating a method of operating configurations included in an image forming apparatus, according to an example;

FIG. 4 is a diagram for explaining an operation, performed by an image forming apparatus, of downloading an execution file of a personal information protection policy from a server, according to an example;

FIG. 5 is a diagram for explaining an operation, performed by an image forming apparatus, of setting a personal information protection policy, according to an example;

FIG. 6 is a diagram for explaining a process of determining whether a job to be performed by an image forming apparatus is restricted to a personal information protection policy, according to an example;

FIG. 7 is a diagram for explaining an operation, performed by an image forming apparatus, of restricting use of a scan to file transfer protocol (FTP) function based on a personal information protection policy, according to an example;

FIG. 8 is a diagram for explaining an operation, performed by an image forming apparatus, of restricting use of a scan to cloud function based on a personal information protection policy according to an example;

FIG. 9 is a diagram for explaining an operation, performed by an image forming apparatus, of restricting use of a scan to optical character recognition (OCR) function based on a personal information protection policy, according to an example;

FIG. 10 is a diagram for explaining an operation, performed by an image forming apparatus, of restricting display of a user interface related to a predetermined job when the predetermined job is restricted to a personal information protection policy, according to an example; and FIG. 11 is a block diagram showing a configuration of an image forming apparatus, according to an example.

Throughout the drawings, it should be noted that like reference numbers are used to depict the same or similar elements, features, parts, components, and structures and thus, a repeated description thereof may be omitted.

MODE FOR THE INVENTION

An image forming apparatus described herein may be any type of apparatus capable of performing an image forming operation, such as a printer, a copier, a scanner, a fax machine, a multi-function printer (MFP), or a display apparatus. Print data, as disclosed herein, may refer to data transformed into a format capable of being printed by a printer. A scan file, as disclosed herein, may refer to a file obtained by scanning an image in a scanner.

Examples are described herein with reference to the accompanying drawings so that the disclosure may be easily performed by one of ordinary skill in the art to which the disclosure pertain. The disclosure may, however, be embodied in many different forms and should not be construed as being limited to the examples set forth herein.

FIG. 1 is a diagram for explaining a method of controlling an operation of an image forming apparatus to prevent personal information from leaking to a non-allowed transfer destination due to a job to be performed by the image forming apparatus, according to an example.

Referring to FIG. 1, it is assumed that there is a personal information protection policy between a first country and a second country restricting the transfer of files including personal information from the first country to the second country. It is also assumed that an image forming apparatus 10 located in the first country has received a command to scan a predetermined document and transfer the scanned scan file to a server 30 located in the second country.

A scan file in which the predetermined document is scanned may be obtained in the image forming apparatus 10 located in the first country. When personal information of a predetermined user is not included in the scan file, the image forming apparatus 10 may transfer the scan file to the server 30 located in the second country.

When the personal information of the predetermined user is included in the scan file, the image forming apparatus 10 may determine that transfer of the scan file is restricted to the personal information protection policy. The image forming apparatus 10 may control the operation of the image forming apparatus 10 to prevent the scan file from being transferred from the first country to the second country.

FIG. 2 is a flowchart illustrating a method of operating an image forming apparatus, according to an example.

Referring to FIG. 2, the image forming apparatus 10 may activate a personal information protection policy corresponding to a country of use set in the image forming apparatus 10 in operation 210.

For example, the personal information protection policy may include a policy of restricting transfer of a predetermined scan file including predetermined personal information to a predetermined transfer destination based on at least one of a country, a region, an Internet Protocol address (IP Address), or the like. Also, the personal information protection policy may include a policy of restricting storage of the predetermined scan file on a predetermined server or a predetermined external device. Also, the personal information protection policy may include a policy of restricting leakage of predetermined personal information included in the predetermined scan file.

For example, personal information may include names of users, addresses, telephone numbers, email addresses, specific information generated by activities of users, and the like.

The image forming apparatus 10 may request an execution file of the personal information protection policy to be set in the image forming apparatus 10 from a server managing the personal information protection policy. The image forming apparatus 10 may receive the execution file corresponding to a country of use set in the image forming apparatus 10 from the server. The image forming apparatus 10 may activate the personal information protection policy in the image forming apparatus 10 based on the execution file.

The image forming apparatus 10 may set at least one of the country, the region, the IP address, or the like to which the personal information protection policy is applied, based on the execution file.

Further, the image forming apparatus 10 may set at least one application to which the personal information protection policy is to be applied among applications installed in the image forming apparatus 10, based on the execution file. As a specific example, the image forming apparatus 10 may set a function of blocking execution of one application to which the personal information protection policy is to be applied. Also, the image forming apparatus 10 may set a function of blocking transfer or storage of a predetermined file including predetermined personal information to an unauthorized transfer destination, based on the at least one application to which the personal information protection policy is to be applied.

The image forming apparatus 10 may set the personal information protection policy set in the image forming apparatus 10 to be activated or deactivated wholly or according to specific items. For example, the image forming apparatus 10 may set the personal information protection policy not to be applied to a predetermined application.

In operation 220, the image forming apparatus 10 may receive an execution request of a first application installed in the image forming apparatus 10. For example, the image forming apparatus 10 may receive an input to execute the first application through a user interface apparatus of the image forming apparatus 10. For example, the first application may correspond to any one of a scan to file transfer protocol (FTP) application, a scan to cloud application, a scan to optical character recognition (OCR) application, a scan to server message block (SMB), or the like.

In operation 230, the image forming apparatus 10 may determine whether a first operation to be performed by the execution of the first application is restricted to the personal information protection policy.

The image forming apparatus 10 may determine whether the first operation to be performed is restricted to the personal information protection policy based on a first operation of confirming whether the first application is included in the at least one application to which the personal information protection policy is to be applied, a second operation of confirming whether a job of transferring or storing the predetermined file to or in the unauthorized transfer destination is included in the first job, or a third operation of confirming whether the personal information of a predetermined user is included in a first document related to the first job.

For example, the personal information protection policy may include a policy of blocking execution of an application including a scan function. When the first application is any one of the scan to FTP application, the scan to cloud application, the scan to OCR application, the scan to SMB application, or the like, the image forming apparatus 10 may determine that the first job is restricted to the personal information protection policy.

As another example, the personal information protection policy may include a policy of blocking a function of transferring or storing the predetermined file including the personal information to or in the unauthorized transfer destination. When the first application is the scan to FTP application, a first IP address based on FTP is the unauthorized transfer destination, and the first job is to transfer a file including predetermined personal information to the first IP address, the image forming apparatus 10 may determine that the first job is restricted to the personal information protection policy.

As another example, the personal information protection policy may include a policy of performing a function of deleting personal information from the predetermined file including the personal information. When the file read by the first job includes the personal information, the image forming apparatus 10 may determine that the first job is limited to the personal information protection policy.

In an example, the image forming apparatus 10 may obtain a first scan file in which a first document related to a first job is scanned. The image forming apparatus 10 may confirm whether personal information of a predetermined user is included in the first scan file. When the first scan file includes the personal information of the predetermined user, the image forming apparatus 10 may determine whether the first job is restricted to the personal information protection policy. When the first scan file does not include the personal information of the predetermined user, the image forming apparatus 10 may control the operation of the image forming apparatus 10 such that the first job is performed.

In operation 240, the image forming apparatus 10 may control the operation of the image forming apparatus 10, depending on whether the first job is restricted to the personal information protection policy.

When the first job is a job restricted to the personal information protection policy, the image forming apparatus 10 may control the operation of the image forming apparatus 10 such that the first job is not performed. When the first operation is a job not restricted to the personal information protection policy, the image forming apparatus 10 may control the operation of the image forming apparatus 10 such that the first job is performed.

For example, when it is determined that the personal information of the predetermined user is included in the first document related to the first job, the image forming apparatus 10 may delete the personal information of the predetermined user from the first document and control the operation of the image forming apparatus 10 such that a subsequent operation of the first job is performed.

Also, when the first job is the job restricted to the personal information protection policy, the image forming apparatus 10 may display a message indicating that the first job may not be performed on the user interface apparatus of the image forming apparatus 10.

Further, when the first job is the job restricted to the personal information protection policy, the image forming apparatus 10 may restrict display of a user interface related to the first job in the user interface apparatus of the image forming apparatus 10. That is, the user interface apparatus may deactivate the user interface related to the first job.

FIG. 3 is a flowchart illustrating a method of operating configurations included in an image forming apparatus, according to an example.

Referring to FIG. 3, the image forming apparatus 10 may include a communication apparatus 1110, a memory 1120, a user interface apparatus 1130, and a processor 1140. Also, the processor 1140 may include a policy module 1141 and an application module 1142. The image forming apparatus 10 may be implemented by using more or fewer components.

In operation 301, the policy module 1141 may request an execution file of a personal information protection policy to be set in the image forming apparatus 10 from a server 20 managing the personal information protection policy through the communication apparatus 1110.

In operation 302, the policy module 1141 may receive from the server 20 an execution file corresponding to a country of use set in the image forming apparatus 10 through the communication apparatus 1110.

In operation 303, the user interface apparatus 1130 may receive an input to set the personal information protection policy.

For example, the user interface apparatus 1130 may receive an input to set at least one of a country, a region, an IP address, or the like to which the personal information protection policy is to be applied. Also, the user interface apparatus 1130 may receive an input to set at least one application to which the personal information protection policy is to be applied among applications installed in the image forming apparatus 10.

In an example, the user interface apparatus 1130 may receive an input to set a function of blocking execution of the at least one application to which the personal information protection policy is to be applied. Also, the user interface apparatus 1130 may receive an input to set a function of blocking transfer or storage of a predetermined file including predetermined personal information to or in an unauthorized transfer destination.

In operation 304, the policy module 1141 may set the personal information protection policy based on the input received from the user interface apparatus 1130. Also, the policy module 1141 may set the personal information protection policy based on the execution file of the personal information protection policy.

In operation 305, the memory 1120 may store the set personal information protection policy.

In operation 306, the user interface apparatus 1130 may receive an execution request of a first application.

In operation 307, the application module 1142 may prepare a first job to be performed by the image forming apparatus 10, in response to the execution request of the first application.

In operation 308, the application module 1142 may request the personal information protection policy from the policy module 1141. In operation 309, the policy module 1141 may transfer the personal information protection policy to the application module 1142.

In operation 310, the application module 1142 may determine whether the first job is restricted to the personal information protection policy.

In operation 311, when the first job is a job restricted to the personal information protection policy, the user interface apparatus 1130 may display a message indicating that the first job may not be performed. Also, the user interface apparatus 1130 may limit display of a user interface related to the first job.

In operation 312, the application module 1142 may control an operation of a first application based on a result obtained by determining whether the first job is restricted to the personal information protection policy. For example, when the first job is the job restricted to the personal information protection policy, the application module 1142 may prevent the first job from being performed.

Hereinafter, various operations and applications performed by the image forming apparatus 10 will be described. Although a configuration of the communication apparatus 1110, the memory 1120, the user interface apparatus 1130, and the processor 1140 of the image forming apparatus 10 may not be defined, it will be understood that descriptions that one of ordinary skill in the art of the present disclosure may clearly understand and predict through general implementations and the scope of the present disclosure is not limited by a name of a specific configuration or a physical/logical structure.

FIG. 4 is a diagram for explaining an operation, performed by an image forming apparatus, of downloading an execution file of a personal information protection policy from a server, according to an example.

Referring to FIG. 4, the server 20 may set and manage the personal information protection policy for each country as shown in table 410. The server 20 may set the personal information protection policy of a country code, a country number, a country name, a country region, or the like for each country and store the personal information protection policy in a storage of the server 20. Here, the personal information protection policy of a predetermined country may be a personal information protection policy that must be complied with on the basis of the predetermined country.

The personal information protection policy may include a policy of restricting transfer of a document, a file, etc. including personal information to a predetermined transfer destination. The predetermined transfer destination may be determined based on at least one of a country, a region, an IP address, or the like. Also, the personal information protection policy may include a policy of restricting storage of the document, the file, or the like including the personal information in the predetermined server 20 or a predetermined external apparatus. Also, the personal information protection policy may include a policy of deleting and storing the personal information when storing the document, the file, or the like including the personal information.

When there is a first country in which the personal information protection policy is changed, the server 20 may update and store a change in the personal information protection policy of the first country stored in the storage. The server 20 may periodically confirm whether there is a change in the personal information protection policy by using a management apparatus managing the personal information protection policy for each country.

The image forming apparatus 10 may request an execution file of the personal information protection policy to be set in the image forming apparatus 10 from the server 20 managing the personal information protection policy. The server 20 may transfer an execution file corresponding to a country of use set in the image forming apparatus 10 to the image forming apparatus 10.

For example, when the country of use set in the image forming apparatus 10 is Korea, the image forming apparatus 10 may set a personal information protection policy to be complied with on the basis of Korea. The image forming apparatus 10 may request the personal information protection policy of Korea from the server 20. The server 20 may transfer data 411 including an execution file that may execute the personal information protection policy of Korea to the image forming apparatus 10. The image forming apparatus 10 may set and activate the personal information protection policy of Korea in the image forming apparatus 10 based on the data 411 received from the server 20.

In an example, the server 20 may transfer data including an execution file capable of executing a personal information protection policy for each country to the image forming apparatus 10. The image forming apparatus 10 may extract the execution file corresponding to the personal information protection policy of Korea from the data. The image forming apparatus 10 may set and activate the personal information protection policy of Korea in the image forming apparatus 10 based on the extracted execution file.

Referring to the table 410 in FIG. 4, the personal information protection policy of Korea may include a policy of restricting the transfer of a document, a file, etc. including personal information to another region, and a policy of restricting reading of characters, numbers or other forms of symbols in the document, the file, etc. including the personal information. Also, the personal information protection policy of Korea may include policies in addition to the above-mentioned policies, and may include policies other than the above-mentioned policies.

FIG. 5 is a diagram for explaining an operation, performed by an image forming apparatus, of setting a personal information protection policy, according to an example.

Referring to FIG. 5, a user interface apparatus of the image forming apparatus 10 may display a screen 510 for setting the personal information protection policy. For example, the user interface apparatus may display a screen for setting a country, a region, an IP address, or the like to which the personal information protection policy is to be applied.

The user interface apparatus may display each of the country, the region, the IP address, or the like that are set by reflecting the personal information protection policy based on the personal information protection policy obtained from a server. For example, the personal information protection policy may include a policy of restricting transfer of a file including personal information to the European region. On a setting screen for setting a region with respect to the personal information protection policy, the user interface apparatus may display a setting screen for restricting transfer of the file including the personal information to "Europe" only. Here, the user interface apparatus may receive a setting input restricting the transfer of the file including personal information to "America" and "Asia".

As shown in the screen 510, when the user interface apparatus receives an input selecting "OK" on the setting screen for setting the region with respect to the personal information protection policy, the image forming apparatus 10 may set the personal information protection policy such that the transfer of the file including the personal information is restricted to "America, Europe, Asia" 511.

The user interface apparatus of the image forming apparatus 10 may display a screen 520 for setting at least one application to which the personal information protection policy is to be applied among applications installed in the image forming apparatus 10.

That is, the user interface apparatus may display the at least one application to which the personal information protection policy is to be applied, based on the personal information protection policy obtained from the server. For example, the personal information protection policy may include a policy of restricting a function of transferring or storing the file including the personal information to a predetermined transfer destination. On the screen for setting an application with respect to the personal information protection policy, the user interface apparatus may display an icon 521 of a scan to FTP application performing a FTP function after scanning a file, among the applications installed in the image forming apparatus 10, an icon 522 of a scan to cloud application performing a function of storing the file in the cloud after scanning the file, and an icon 523 of a scan to OCR application performing an OCR function after scanning the file. Here, the user interface apparatus 1130 may receive an input to select each of the scan to FTP application, the scan to cloud application, and the scan to OCR application.

For example, the image forming apparatus 10 may set the personal information protection policy such that when receiving a request for execution of any one of the scan to FTP application, the scan to cloud application, and the scan to OCR application, the execution of the requested application is blocked.

As another example, the image forming apparatus 10 may set the personal information protection policy such that when any one of the scan to FTP application, the scan to cloud application, and the scan to OCR application is executed, a function of transferring or storing a file including predetermined personal information to or in an unauthorized transfer destination is blocked.

As another example, the image forming apparatus 10 may set the personal information protection policy such that when the scan to OCR application is executed, a function of scanning and storing the file including the predetermined personal information is blocked or the predetermined personal information is deleted and stored after the file including the predetermined personal information is scanned.

FIG. 6 is a diagram for explaining a process of determining whether a job to be performed by an image forming apparatus is restricted to a personal information protection policy, according to an example.

Referring to FIG. 6, the image forming apparatus 10 may determine whether the job to be performed by the image forming apparatus 10 is restricted to the personal information protection policy in the order of operations 610, 620, and 630. Further, the image forming apparatus 10 may determine whether the job to be performed by the image forming apparatus 10 is restricted to the personal information protection policy according to a change in the order of operations 610, 620, and 630 shown in FIG. 6.

In operation 610, the image forming apparatus 10 may confirm whether a first application requested to be executed is included in at least one application to which the personal information protection policy is to be applied.

When the first application is included in the at least one application, according to operation 642, the image forming apparatus 10 may determine that a first job to be performed by execution of the first application is restricted to the personal information protection policy.

When the first application is not included in the at least one application, the image forming apparatus 10 may confirm whether a job of transferring or storing a predetermined file to an unauthorized transfer destination is included in the first job in operation 620.

When the job of transferring or storing the predetermined file to the unauthorized transfer destination is included in the first job, the image forming apparatus 10 may determine that the first job to be performed by the execution of the first application is restricted to the personal information protection policy in operation 642.

When the job of transferring or storing the predetermined file to the unauthorized transfer destination is not included in the first job, the image forming apparatus 10 may confirm whether personal information of a predetermined user is included in a first document related to the first job in operation 630.

When the personal information of the predetermined user is included in the first document, the image forming apparatus 10 may determine that the first job to be performed by the execution of the first application is restricted to the personal information protection policy in operation 642.

When the personal information of the predetermined user is not included in the first document, the image forming apparatus 10 may determine that the first job to be performed by the execution of the first application is not restricted to the personal information protection policy in operation 641.

FIG. 7 is a diagram for explaining an operation, performed by an image forming apparatus, of restricting use of a scan to FTP function based on a personal information protection policy, according to an example.

Referring to FIG. 7, the image forming apparatus 10 may execute an application of performing the scan to FTP function as shown in screen 710. A user interface apparatus of the image forming apparatus 10 may scan 711 a predetermined file and display a screen for setting a command to transfer the scanned file to a predetermined transfer destination by using an FTP 712.

For example, when the user interface apparatus 1130 receives an input to select the FTP 712, the image forming apparatus 10 may determine whether execution of the application performing the scan to FTP function is restricted according to the personal information protection policy based on the personal information protection policy set in the image forming apparatus 10. When the execution of the application performing the scan to FTP function is restricted according to the personal information protection policy, as shown in screen 720, the user interface apparatus may display a message 721 indicating that "the use of the FTP function is restricted according to the personal information protection policy".

As another example, when the user interface apparatus receives the input to select the FTP 712, the user interface apparatus may display a screen 730 including a window inputting information necessary for performing the scan to FTP function. The user interface apparatus may receive IP address information 731. The image forming apparatus 10 may determine whether an IP address included in the IP address information 731 is an authorized transfer destination to transfer a file including personal information based on the personal information protection policy set in the image forming apparatus 10. When the IP address is not the authorized transfer destination to transfer the file including the personal information, the user interface apparatus may display a screen 740 including a message 741 indicating that "the use of the FTP function is restricted since IP (172.217.255.255) corresponds to a region that does not comply with the personal information protection policy".

FIG. 8 is a diagram for explaining an operation, performed by an image forming apparatus, of restricting use of a scan to cloud function based on a personal information protection policy, according to an example.

Referring to FIG. 8, the image forming apparatus 10 may execute an application of performing the scan to cloud function as shown in screen 810. The user interface apparatus of the image forming apparatus 10 may scan a predetermined file and display a screen for setting a command to transfer the scanned file to the cloud.

For example, when the user interface apparatus receives a command to perform the scan to cloud function, the image forming apparatus 10 may determine whether the application performing the scan to cloud function is an application whose execution is restricted according to the personal information protection policy based on the personal information protection policy set in the image forming apparatus 10. When the application performing the scan to cloud function is the application whose execution is restricted according to the personal information protection policy, the user interface apparatus may display a screen 820 including a message 821 indicating that "the use of the scan to cloud function is restricted according to the personal information protection policy".

For another example, when the user interface apparatus receives the command to perform the scan to cloud function, the user interface apparatus may display a screen 830 including a window 831 to select a country of a transfer destination according to the scan to cloud function. The user interface apparatus may receive an input to select France (FR) 832, Italy (IT) 833, and the Netherlands (NL) 834. The image forming apparatus 10 may determine whether France (FR) 832, Italy (IT) 833, and the Netherlands (NL) 834 are authorized transfer destinations to transfer a file including personal information based on the personal information protection policy set in the image forming apparatus 10. When any one country of France (FR) 832, Italy (IT) 833, and the Netherlands (NL) 834 is not the authorized transfer destination to transfer the file including the personal information, the user interface apparatus may display a screen 840 including a message 841 indicating that "the country may not be selected since the country does not comply with the personal information protection policy".

FIG. 9 is a diagram for explaining an operation, performed by an image forming apparatus, of restricting use of a scan to OCR function based on a personal information protection policy, according to an example.

Referring to FIG. 9, the image forming apparatus 10 may execute an application of performing the scan to OCR function as shown in screen 910. The user interface apparatus of the image forming apparatus 10 may scan a predetermined file and display a screen 911 for setting a command to read characters, numbers, symbols, and the like in the scanned file.

For example, when the user interface apparatus receives a command to perform the scan to OCR function, the image forming apparatus 10 may determine whether the application performing the scan to OCR function is an application whose execution is restricted according to the personal information protection policy based on the personal information protection policy set in the image forming apparatus 10. When the application performing the scan to OCR function is the application whose execution is restricted according to the personal information protection policy, the user interface apparatus may display a screen 920 including a message 921 indicating that "the use of the scan to OCR function is restricted according to the personal information protection policy".

For another example, when the user interface apparatus receives the command to perform the scan to OCR function, the user interface apparatus may display a screen 930 including a file obtained by reading the characters, the numbers, the symbols, and the like in the scanned file according to the scan to OCR function. The image forming apparatus 10 may confirm whether personal information 931 of a predetermined user is included in the read file. When the personal information 931 of the predetermined user is included in the read file, the user interface apparatus may display a message 932 indicating that "the personal information is detected in the converted text. The personal information is deleted according to the personal information protection policy". The image forming apparatus 10 may obtain a file 941 from which the personal information 931 of the predetermined user is deleted from the read file. The user interface apparatus may display a screen 940 including the file 941 from which the personal information 931 of the predetermined user is deleted. The image forming apparatus 10 may store the file 941 from which the personal information 931 of the predetermined user is deleted in a memory or transfer the file 941 to a predetermined transfer destination.

FIG. 10 is a diagram for explaining an operation, performed by an image forming apparatus, of restricting display of a user interface related to a predetermined job when the predetermined job is restricted to a personal information protection policy, according to an example.

Referring to FIG. 10, the user interface apparatus of the image forming apparatus 10 may display a screen 1010 including a window to select a country to which a scan file is to be transferred. In this case, the image forming apparatus 10 may obtain country information in which transfer of a file including personal information is restricted, based on the personal information protection policy set in the image forming apparatus 10. For example, based on the personal information protection policy set in the image forming apparatus 10, the image forming apparatus 10 may extract France, Italy, Norway, Poland, and Portugal which are countries to which the transfer of the file including the personal information is restricted from among a plurality of countries.

The user interface apparatus may restrict the display of the user interface such that a country to which the transfer of the file including the personal information is restricted may not be selected from the window to select the country to which the scan file is to be transferred based on the country information. The user interface apparatus 1130 may deactivate 1011 an icon to select each of France, Italy, Norway, Poland, and Portugal such that France, Italy, Norway, Poland, and Portugal may not be selected as countries to which the scan file is to be transferred.

Also, the user interface apparatus may restrict the display of the user interface such that a region to which the transfer of the file including the personal information is restricted may not be selected from a window to select a region to which the scan file is to be transferred.

FIG. 11 is a block diagram showing a configuration of an image forming apparatus, according to an example.

Referring to FIG. 11, the image forming apparatus 10 may include the communication apparatus 1110, the memory 1120, the user interface apparatus 1130, and the processor 1140. However, the illustrated components are not indispensable elements. The image forming apparatus 10 may be implemented by using more or fewer components than those illustrated in FIG. 11. Hereinafter, examples of the components shown in FIG. 11 will be described.

The communication apparatus 1110 may perform communication with an external apparatus. For example, the communication apparatus 1110 may be connected to a network by wire or wirelessly to perform communication with the external apparatus. In an example, the external apparatus may be a server managing the image forming apparatus 10, a server managing a personal information protection policy or an electronic apparatus of a user using the image forming apparatus 10. The communication apparatus 1110 may include a communication module that supports one or more of a variety of wired or wireless communication methods. In an example, a communication module may be in the form of a chipset, or may be a sticker/barcode (e.g., a sticker including a near field communication (NFC) tag) including information necessary for communication, etc. The communication module may be a short-range communication module or a wired communication module.

The communication apparatus 1110 may support at least one of a wireless LAN, a wireless fidelity (Wi-Fi), a Wi-Fi Direct, a Bluetooth, a Universal Serial Bus (USB), a Wired LAN, NFC, etc.

The communication apparatus 1110 may be connected to the server managing a personal information protection policy to transfer and receive signals or data.

The memory 1120 may store programs, data, or files related to the image forming apparatus 10. The processor 1140 may execute the programs stored in the memory 1120, read the data or the files stored in the memory 1120, or store new files in the memory 1120. The memory 1120 may store program instructions, data files, data structures, etc., alone or in combination. The memory 1120 may store instructions executable by the processor 1140.

For example, the memory 1120 may store instructions to receive an execution request of a first application installed in the image forming apparatus 10, instructions to determine whether a first job to be performed by the execution of the first application is restricted to a personal information protection policy, and instructions to control an operation of the image forming apparatus 10 according to whether the first job is restricted to the personal information protection policy.

Also, the memory 1120 may store data or information related to the restricted to a personal information protection policy set in the image forming apparatus 10. For example, the memory 1120 may store configuration information of at least one of a country, a region, an IP address, or the like to which the personal information protection policy is applied. Also, the memory 1120 may store configuration information of an application to which the personal information protection policy is applied.

The user interface apparatus 1130 may include an input unit for receiving an input for performing an image forming job from a user, etc., and an output unit for displaying information about a result of the image forming job or a state of the image forming apparatus 10, etc. For example, the user interface apparatus 1130 may include an operation panel for receiving a user input, a display panel for displaying a screen, and the like.

In an example, the input unit may include a device capable of receiving various types of user input, such as a keyboard, a physical button, a touch screen, a camera, a microphone, etc. Further, the output unit may include, in an example, a display panel, a speaker, etc. However, the disclosure is not limited thereto, and the user interface apparatus 1130 may include various devices supporting input/output.

An image forming operation unit (not shown) may include a printing unit, a scanning unit, and a facsimile unit. The image forming operation unit (not shown) may include only some of these elements or may further include elements for performing other kinds of image forming jobs.

The printing unit may form an image on a recording medium by various printing methods such as an electrophotographic method, an inkjet method, a thermal transfer method, a direct thermal method, or the like.

The scanning unit may irradiate light onto a document receive the reflected light, and read an image recorded in the document. In an example, a Charge Coupled Device (CCD) or a contact type image sensor (CIS) may be employed as an image sensor reading the image from the document. The scanning unit may have a flatbed structure in which the document is placed at a fixed position and the image sensor reads the image while moving, a document feed structure in which the image sensor is positioned at a fixed position and the document is transported, or a complex structure of these.

A configuration for scanning the image of the facsimile unit may be shared with the scanning unit. A configuration for printing the received file may be shared with the printing unit. The facsimile unit may transfer a scan file to a destination or receive the scan file from the outside.

The processor 1140 may control an operation of the image forming apparatus 10 and may include at least one processor such as a central processing unit (CPU) or the like. The processor 1140 may control other configurations included in the image forming apparatus 10 to perform an operation corresponding to the user input received through the user interface apparatus 1130. The processor 1140 may include at least one specialized processor corresponding to each function or may be an integrated processor.

The processor 1140 may activate the personal information protection policy corresponding to a country of use set in the image forming apparatus 10.

For example, the personal information protection policy may include a policy of restricting transfer of a predetermined scan file including predetermined personal information to a predetermined transfer destination based on at least one of a country, a region, an IP Address, or the like. Also, the personal information protection policy may include a policy of restricting storage of the predetermined scan file on a predetermined server or a predetermined external device. Also, the personal information protection policy may include a policy of restricting leakage of the predetermined personal information included in the predetermined scan file.

The processor 1140 may request from a server that manages the personal information protection policy an execution file of the personal information protection policy to be set in the image forming apparatus 10 through the communication apparatus 1110. The processor 1140 may receive an execution file corresponding to the country of use set in the image forming apparatus 10 from the server through the communication apparatus 1110. The processor 1140 may activate the personal information protection policy in the image forming apparatus 10 based on the execution file.

The processor 1140 may set, based on the execution file, at least one of a country, a region, an IP address, or the like to which the personal information protection policy is to be applied.

Further, the processor 1140 may set at least one application to which the personal information protection policy is to be applied among applications installed in the image forming apparatus 10, based on the execution file. For example, the processor 1140 may set a function to block execution of one application to which the personal information protection policy is to be applied. Also, the processor 1140 may set a function of blocking transfer or storage of a predetermined file including predetermined personal information to an unauthorized transfer destination based on the at least one application to which the personal information protection policy is to be applied.

The processor 1140 may receive an execution request for a first application installed in the image forming apparatus 10 through the user interface apparatus 1130.

The processor 1140 may determine whether a first job to be performed by execution of the first application is restricted to the personal information protection policy.

For example, the processor 1140 may determine whether the first job is restricted to the personal information protection policy based on at least one of a first operation of confirming whether the first application is included in the at least one application to which the personal information protection policy is to be applied, a second operation of confirming whether a job of transferring or storing the predetermined file to or in the unauthorized transfer destination is included in the first job, and a third operation of confirming whether the personal information of the predetermined user is included in a first document related to the first job.

The processor 1140 may obtain a first scan file in which the first document related to the first job is scanned. The processor 1140 may confirm whether the personal information of the predetermined user is included in the first scan file. When the personal information of the predetermined user is included in the first scan file, the processor 1140 may determine whether the first job is restricted to the personal information protection policy. In an example, when the personal information of the predetermined user is not included in the first scan file, the processor 1140 may control the operation of the image forming apparatus 10 such that the first job is performed.

The processor 1140 may control an operation of the image forming apparatus 10 according to whether the first job is restricted to the personal information protection policy.

When the first job is a job restricted to the personal information protection policy, the processor 1140 may control the operation of the image forming apparatus 10 such that the first job is not performed. In an example, when the first job is not a job restricted to the personal information protection policy, the processor 1140 may control the operation of the image forming apparatus 10 such that the first job is performed.

For example, when it is determined that the personal information of the predetermined user is included in the first document related to the first job, the processor 1140 may delete the personal information of the predetermined user from the first document and control the operation of the image forming apparatus 10 such that a subsequent operation of the first job is performed.

Also, when the first job is a job restricted to the personal information protection policy, the processor 1140 may control the user interface apparatus 1130 to display a message indicating that the first job may not be performed on the user interface apparatus 1130 of the image forming apparatus 10.

Also, when the first job is a job restricted to the personal information protection policy, the processor 1140 may control the user interface apparatus 1130 to restrict the display of the user interface related to the first job on the user interface apparatus 1130 of the image forming apparatus 10.

The above-described methods of operating the image forming apparatus 10 and the server 20 may be embodied in the form of a non-transitory computer-readable recording medium storing computer-executable instructions or data. The above-described examples may be written as computer programs and may be implemented in general-use digital computers that execute the programs using a computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

While the disclosure has been shown and described with reference to examples thereof, it will be understood by those of ordinary skill in the art that various changes in form and details may be made therein without departing from the spirit and scope of the disclosure as defined by the following claims. In an example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

The invention claimed is:

1. A method of operating an image forming apparatus, the method comprising:
    requesting, from a server, an execution file of a personal information protection policy to be set in the image forming apparatus;
    receiving, from the server, the execution file corresponding to a country of use set in the image forming apparatus;
    executing the execution file to activate the personal information protection policy corresponding to the country of use set in the image forming apparatus;
    receiving a request to execute a first application installed in the image forming apparatus;
    determining whether a first job of the first application is restricted to the personal information protection policy by confirming whether personal information of a predetermined user is included in a first document related to the first job; and
    controlling an operation of the image forming apparatus according to whether the first job is restricted to the personal information protection policy by deleting the personal information of the predetermined user from the first document, obtaining a file from which the personal information of the predetermined user is deleted, and storing the obtained file.

2. The method of claim 1, wherein the executing of the personal information protection policy in the image forming apparatus based on the execution file comprises at least one of:
    setting at least one of a country, a region, or an Internet Protocol (IP) address to which the personal information protection policy is to be applied, based on the execution file; or
    setting at least one application to which the personal information protection policy is to be applied among applications installed in the image forming apparatus, based on the execution file.

3. The method of claim 2, wherein the setting of the at least one application to which the personal information protection policy is to be applied among the applications installed in the image forming apparatus, based on the execution file, comprises at least one of:
    setting a function of blocking execution of the at least one application to which the personal information protection policy is to be applied; or
    setting a function of blocking transfer or storage of a predetermined file comprising predetermined personal information to an unauthorized transfer destination, based on the at least one application to which the personal information protection policy is to be applied.

4. The method of claim 1, wherein the personal information protection policy comprises at least one of:
    a first policy restricting transfer of a predetermined scan file comprising predetermined personal information to a predetermined transfer destination based on at least one of a country, a region, or an IP Address;
    a second policy restricting storage of the predetermined scan file on a predetermined server or a predetermined external device; or
    a third policy restricting leakage of predetermined personal information included in the predetermined scan file.

5. The method of claim 1, wherein whether the first job of the first application is restricted to the personal information protection policy is determined based on at least one of:
    a first operation of confirming whether the first application is included in at least one application to which the personal information protection policy is to be applied; or
    a second operation of confirming whether a job of transferring or storing a predetermined file to or in an unauthorized transfer destination is included in the first job.

6. The method of claim 5, wherein, the controlling of the operation of the image forming apparatus comprises:
    controlling the operation of the image forming apparatus such that a subsequent operation of the first job is performed.

7. The method of claim 1, wherein the determining of whether the first job of the first application is restricted to the personal information protection policy comprises:
    obtaining a first scan file in which a first document related to the first job is scanned;
    confirming whether personal information of a predetermined user is included in the first scan file; and
    determining whether the first job is restricted to the personal information protection policy when the personal information of the predetermined user is included in the first scan file.

8. The method of claim 1, wherein the controlling of the operation of the image forming apparatus according to whether the first job is restricted to the personal information protection policy comprises:
    controlling the operation of the image forming apparatus such that the first job is not performed when the first job is a job restricted to the personal information protection policy; and
    controlling the operation of the image forming apparatus such that the first job is performed when the first job is a job not restricted to the personal information protection policy.

9. The method of claim 8, wherein the controlling of the operation of the image forming apparatus such that the first job is not performed when the first job is the job restricted to the personal information protection policy comprises at least one of:
    displaying, on a user interface apparatus of the image forming apparatus, a message informing that the first job is not performed; or
    restricting display of a user interface related to the first job in the user interface apparatus.

10. A non-transitory computer-readable recording medium having recorded thereon instructions executable by a processor, the non-transitory computer-readable recording medium comprising:

instructions to request, from a server, an execution file of a personal information protection policy to be set in an image forming apparatus;

instructions to receive, from the server, the execution file corresponding to a country of use set in the image forming apparatus;

instructions to execute the execution file to activate the personal information protection policy corresponding to the country of use set in an image forming apparatus;

instructions to receive a request to execute a first application installed in the image forming apparatus;

instructions to determine whether a first job of the first application is restricted to the personal information protection policy by confirming whether personal information of a predetermined user is included in a first document related to the first job; and instructions to control an operation of the image forming apparatus according to whether the first job is restricted to the personal information protection policy by deleting the personal information of the predetermined user from the first document, obtaining a file from which the personal information of the predetermined user is deleted, and storing the obtained file.

11. An image forming apparatus comprising:

a communication apparatus to perform communication with an external apparatus;

a processor to control an operation of the image forming apparatus;

a user interface apparatus to output information related to the operation of the image forming apparatus; and a memory storing instructions executable by the processor, wherein the processor executes the instructions to:

request, from a server, an execution file of a personal information protection policy to be set in the image forming apparatus, receive, from the server, the execution file corresponding to a country of use set in the image forming apparatus, execute the execution file to activate the personal information protection policy corresponding to the country of use set in the image forming apparatus, receive a request to execute a first application installed in the image forming apparatus, determine whether a first job of the first application is restricted to the personal information protection policy by confirming whether personal information of a predetermined user is included in a first document related to the first job, and control an operation of the image forming apparatus according to whether the first job is restricted to the personal information protection policy by deleting the personal information of the predetermined user from the first document, obtaining a file from which the personal information of the predetermined user is deleted, and storing the obtained file.

12. The image forming apparatus of claim 11, wherein the processor further executes the instructions to determine whether the first job of the first application is restricted to the personal information protection policy, based on at least one of:

a first operation of confirming whether the first application is included in at least one application to which the personal information protection policy is to be applied; or a second operation of confirming whether a job of transferring or storing a predetermined file to or in an unauthorized transfer destination is included in the first job.

13. The image forming apparatus of claim 12, wherein the processor further executes the instructions to control the operation of the image forming apparatus such that a subsequent operation of the first job is performed.

14. The image forming apparatus of claim 11, wherein, when the first job is a job restricted to the personal information protection policy, the processor further executes the instructions to display, on a user interface apparatus of the image forming apparatus, a message informing that the first job is not performed, and restrict display of a user interface related to the first job in the user interface apparatus.

* * * * *